United States Patent [19]

Gerteis

[11] Patent Number: 4,702,831
[45] Date of Patent: Oct. 27, 1987

[54] FILTER FOR SQUEEZING OUT SUSPENSIONS

[75] Inventor: Hans Gerteis, Bietigheim-Bissingen, Fed. Rep. of Germany

[73] Assignee: Heinkel Industriezentrifugen GmbH & Co., Bietigheim-Bissingen, Fed. Rep. of Germany

[21] Appl. No.: 853,237

[22] Filed: Apr. 17, 1986

[30] Foreign Application Priority Data

May 10, 1985 [DE] Fed. Rep. of Germany ....... 3516819

[51] Int. Cl.$^4$ ............................................. B01D 29/00
[52] U.S. Cl. ..................... 210/236; 100/211; 210/408; 210/457
[58] Field of Search ............... 100/198, 211; 210/232, 210/236, 391, 398, 399, 402, 407, 408, 457, 241, 350; 137/315

[56] References Cited

U.S. PATENT DOCUMENTS

| 3,712,209 | 1/1973 | Gwilliam | 210/350 X |
| 3,713,382 | 1/1973 | Gwilliam | 100/211 X |
| 3,753,499 | 8/1973 | Gwilliam | 100/211 |
| 3,762,560 | 10/1973 | Gwilliam | 210/350 |
| 3,805,961 | 4/1974 | Clark et al. | 210/350 |
| 4,246,122 | 1/1981 | Keat | 210/350 |
| 4,533,472 | 8/1985 | Verri et al. | 210/350 |

FOREIGN PATENT DOCUMENTS 2549040 8/1979 Fed. Rep. of Germany.

Primary Examiner—Richard V. Fisher
Assistant Examiner—W. Gary Jones
Attorney, Agent, or Firm—Shenier & O'Connor

[57] ABSTRACT

A filter for squeezing or pressing out suspensions has the following main components: a boiler-shaped outer casing, a cover closing the outer casing at its open end, a tubular filter element projecting from the cover and a membrane which is arranged between outer casing and filter element and connected on the one hand to the open end of the outer casing and, on the other, to the end face of the filter element remote from the cover such that the membrane is inverted when the cover is removed coaxially from the outer casing. In a filter of this type, the membrane and the filter element are pivotable or rotatable as a unit about their common axis when the outer casing is in its closed state.

5 Claims, 4 Drawing Figures

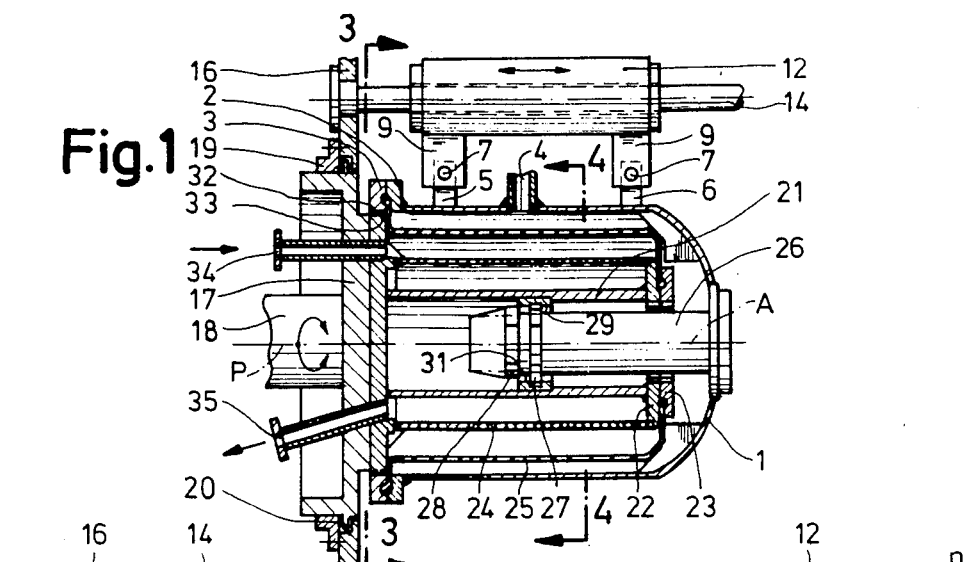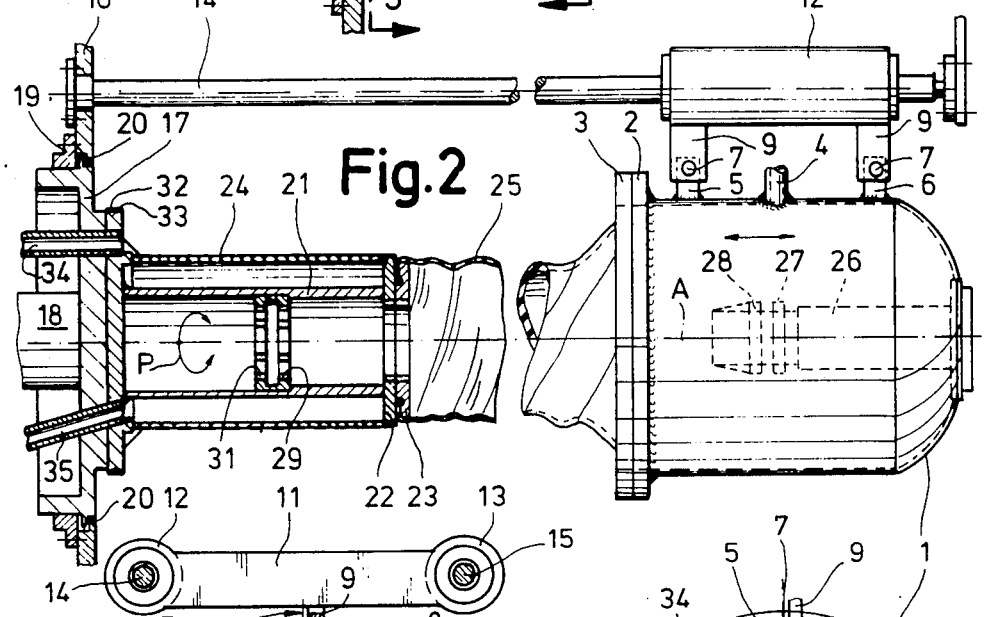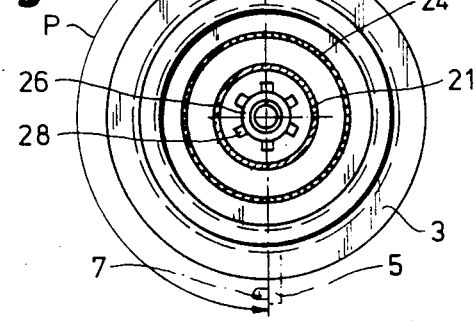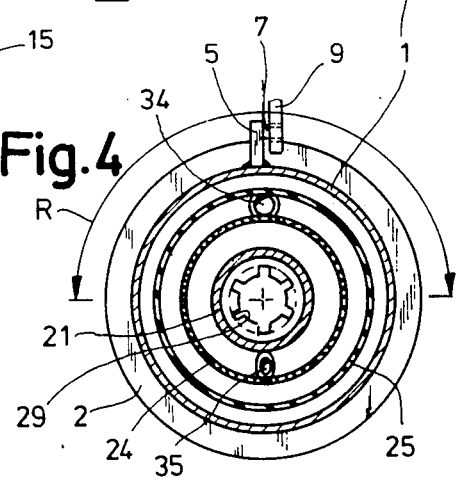

FILTER FOR SQUEEZING OUT SUSPENSIONS

The invention relates to a filter for squeezing or pressing out suspensions comprising a boiler-shaped outer casing, a cover releasably closing the outer casing at its open end face, a tubular filter element projecting from the cover coaxially to the axis of the outer casing, a flexible, hose-like membrane arranged coaxially between the outer casing and the filter element, this membrane being connected at one edge to the open end face of the outer casing and at the other edge to the free end face of the filter element remote from the cover such that the membrane is inverted when the cover is removed coaxially from the outer casing, also comprising a short suction and pressure connection pipe on the outer casing, a feed connection pipe for the suspension and a discharge connection pipe for the filtrate, these pipes being provided on the cover.

In known filters of this type (German patent specification No. DE-PS 25 49 040) either the outer casing or the cover is stationarily mounted and these two parts may be moved linearly back and forth only in the direction of their common axis to open or close the filter. In the closed state of the filter the entire arrangement is stationary. During filtering of quickly settling suspensions, this results in the filter cake being unevenly deposited on the filter element and, in particular, collecting mainly on its underside. In addition, in the opened state of the known filter it is necessary to remove the filter cake from the upper side of the filter element either manually or with the aid of special devices and this makes it very difficult or even impossible for such a filter to be operated automatically.

The object of the invention is to automate to a large extent the filtering process for a filter of the type in question and hereby, in particular, to enable the filter cake to be evenly deposited over the entire circumferential surface of the filter element when the filter is in a closed state.

This object is accomplished in accordance with the invention in that in the closed state of the filter the outer casing, the membrane and the filter element are pivotable or rotatable as a unit about their common axis.

In order to effect automatic separation of the filter cake from the filter element when the filter is in its opened state as well, a preferred embodiment of the invention is designed such that in the opened state of the filter, with the outer casing stationary, the filter element is pivotable or rotatable while the membrane is twisted.

The following description of a preferred embodiment serves to explain the invention in greater detail in conjunction with the attached drawings, in which FIG. 1 shows a filter in its closed state and comprising an invertable membrane;

FIG. 2 shows the filter of FIG. 1 in its opened state;

FIG. 3 is a sectional view along line 3—3 in FIG. 1 when the filter is opened and FIG. 4 is a sectional view along line 4—4 in FIG. 1.

The filter shown in the drawings comprises a boiler-shaped outer casing 1 which has a circular cross section and is open on one side (to the left in FIGS. 1 and 2) where it bears a circumferential flange consisting of two parts 2, 3. Part 2 is rigidly connected to the outer casing 1 and part 3 is detachably mounted on part 2, e.g. by screw bolts. The outer casing 1 has a short suction and pressure connection pipe 4 leading into its interior space. Two arms 5, 6 project radially from the upper surface of the outer casing 1 and mount connecting pins 7 which are directed at right angles to these arms. These pins 7 enable the outer casing 1 to be detachably suspended from one side (from the left in FIG. 3) in corresponding openings 8 in vertical support brackets 9. These support brackets 9 are rigidly connected to transverse struts 11 (FIG. 3) mounted at their ends to slides 12, 13. The slides 12, 13 are displaceable on straight guide bars 14, 15. This means that the entire outer casing 1 is linearly displaceable along the guide bars 14, 15 which are rigidly mounted in a stationary machine frame 16 which is only partially illustrated.

A cover 17 for releasably closing the open end face of the outer casing is rotatably mounted in a groove 20 in the machine frame 16. The cover 17 rotates or pivots in the directions of the double-headed arrow P. The arrangement may be such that the cover 17 is attached in a cantilever manner to a rotatable shaft 18. The seal between the rotating cover 17 and the machine frame 16 is effected by a flange 19 projecting axially from the cover and engaging in a corresponding groove 20 in the machine frame 16. The cover 17 is pivoted or rotated by an electric motor through the intermediary of a corresponding gearing.

A rigid tube 21 projects from the inner side of the cover 17 facing the outer casing 1. This tube bears on its free end a flange which consists of two parts 22, 23 in a similar manner to the flange on the opening of the outer casing 1. Part 22 is rigidly connected to the tube 21, part 23 may be mounted on part 22, e.g. by screw bolts. A tubular filter element 24 extends between the inner side of the cover 17 and the flange part 22. This filter element is designed, for example, like a screen drum covered by a filter cloth.

One edge of an elastic, flexible, hose-like membrane 25 is securely clamped between the flange parts 2, 3 of the outer casing and the other edge between the flange parts 22, 23 of the tube 21 connected to the cover 17. In the closed state of the filter (FIG. 1) this membrane extends coaxially between the inside of the outer casing 1 and the outside of the filter element 24. In the opened state of the filter (FIG. 2) the membrane 25 has been inverted or turned inside out in relation to FIG. 1 such that its inside is now the outside. In this state the membrane extends between the tube 21 and the casing 1 (FIG. 2).

A rigid closure arm 26 projects coaxially inwards from the end face of the outer casing 1 (located to the right in FIGS. 1 and 2) The free, conically shaped end of this arm bears two toothed rings 27, 28 which are spaced apart from one another and have radially aligned teeth. Two interconnected internally toothed rings 29, 31 are rotatably mounted in the interior of the tube 21. The space between the two internally toothed rings 29, 31 corresponds to the axial thickness of the toothed ring 27 firmly mounted on the arm 26. Means, which are not illustrated for the sake of simplicity, are provided for rotating the two rigidly interconnected, internally toothed rings 29, 31 relative to the tube 21. These means may, for example, consist of a rotatable tube, which extends outwards through the cover 17 and the shaft 18, encircles the free end of the arm 26 and is positively connected to the two toothed rings 29, 31, or a remote-controlled servomotor stationarily mounted in the interior of the tube 21.

The rigid connection between the outer casing 1 and the cover 17 is brought about as follows, proceeding from the position illustrated in FIG. 2: The outer casing 1 is moved to the left with the aid of the slides 12, 13. The two internally toothed rings 29, 31 take up a position such that the gaps between their teeth are aligned with the teeth of the toothed rings 27, 28 arranged on the arm 26. This means that the free end of the arm 26 may be displaced through the internally toothed rings 29, 31 to such an extent that the internally toothed ring 31 is located between the externally toothed rings 27, 28. The two rigidly interconnected, internally toothed rings 29, 31 are now rotated relative to the outer casing 1, which is held so that it does not rotate, through an angular measurement corresponding approximately to the width of a tooth. In this way, the outer casing 1 and the cover 17 are firmly locked together in axial direction in the manner of a bayonet catch. The interlocking connection between the outer casing 1 and the cover 17 is such that the two elements do not rotate relative to one another. As illustrated in FIGS. 1 and 2, sealing rings 32, 33 are provided on the cover and interact with the flange part 3 on the outer casing 1 such that the end opening of the outer casing 1 may be closed by the cover 17 so as to be fluid-tight.

The cover 17 is provided with a feed connection pipe 34 for the suspension to be filtered. This pipe penetrates the cover and is connected to a hose. A discharge connection pipe 35 which also penetrates the cover 17 may likewise be connected to a hose and serves to drain off the filtrate.

In the closed position of the filter shown in FIG. 1 an underpressure or vacuum is first applied to the connection pipe 4 of the outer casing 1 via a conduit which is not illustrated. This causes the membrane 25, which normally abuts closely against the filter element 24, to lift radially outwards. This state is illustrated in FIG. 1. The suspension to be filtered is now introduced into the space between filter element 24 and membrane 25 via the feed connection pipe 34. The cover 17 and the outer casing non-rotatably connected thereto are then pivoted back and forth through an angle of 180° in the directions of the double-headed arrow P (cf. also FIG. 3). This causes the solid substances in the suspension to be deposited evenly over the entire circumference of the filter element in the form of a filter cake. As the outer casing 1 is firmly connected to the cover in this operating condition, the connecting pin 7 is detached from and reconnected to the bracket 9 during each pivoting cycle—cf. FIG. 3. During pivoting movement, the outer casing 1 is borne solely by the cover 17, the arm 26 hereby being additionally supported by the two flange parts 22, 23 in the vicinity of its end remote from the toothed rings 27, 28. These flanges 22, 23 also have teeth, of course, on their inner sides to allow the toothed rings 27, 28 to pass. The filtrate separated from the filter cake flows out of the space between the inside of the filter element 24 and the outside of the tube 21 via the discharge connection pipe 35.

Once the filtering process has ended, i.e. when the fluid component of the suspension has completely drained off through discharge connection pipe 35 as filtrate and the outside of the filter element is evenly covered with solid filter cake, the arrangement is first brought into the position illustrated in FIG. 3, in which the connecting pin 7 again engages in the bracket 9 to create a load bearing connection between the slides 12, 13 and the outer casing 1. In this position, the toothed rings 29, 31 are adjusted by remote control such that the gaps between their teeth are again aligned with teeth of the externally toothed rings 27, 28. By displacing the slides 12, 13 along the guide bars 14, 15 the outer casing 1 is removed from the cover 17 and the filter brought into its opened state as shown in FIG. 2. In this state, the inner side of the membrane 25 is now the outer side. The outer side of the filter element 24 which bears the filter cake is now freely accessible. In this state, in which the outer casing 1 is suspended from the slides 12, 13 such that it is stationary and non-rotatable, the cover 17 is again pivoted back and forth along an angular path corresponding to the double-headed arrow R indicated in FIG. 4. This means that the upper side of the filter element 24 is periodically underneath and so the filter cake automatically drops off due to the force of gravity and the filter element is again uncovered. To support the filter cake as it drops off, compressed air or another pressure gas may be supplied periodically via the discharge connection pipe 35.

Whereas, as shown in FIG. 3, pivoting movement in the closed state of the filter extends between the "twelve o'clock position" and the "six o'clock position", in the opened state shown in FIG. 4 pivoting movement extends between the "three o'clock and the nine o'clock positions". The relative rotation between the non-rotatably held outer casing 1 and the pivoted filter element 24 is absorbed by the flexible membrane which consists of an elastomeric material, the membrane hereby twisting in either direction through 90°. It has been established that the membrane 25 can absorb such stressing without damage.

The arrangement may now be returned to the closed position shown in FIG. 1, whereupon a washing fluid may be introduced through the discharge connection pipe 35 for flushing back the filter element 24. The washing and flushing process is again carried out while the outer casing 1 and the cover 17 are simultaneously pivoted.

In the embodiment of the invention as illustrated and described the cover 17 is axially non-displaceable in relation to the outer casing 1. In a further embodiment, it would be possible for the outer casing 1 to be non-displaceable and the cover 17 to be axially displaceable with the filter element 24 in a corresponding manner. This would not alter the fundamental mode of operation of the filter in any way.

The common axis A of outer casing 1, cover 17, tube 21, filter element 24, membrane 25 and arm 26, which is also the axis of rotation of the squeezing filter, is not absolutely horizontal in practice but slightly inclined (towards the left in FIGS. 1 and 2) so that all the filtrate will flow out of the discharge connection pipe 35.

In its closed position as shown in FIG. 1, the filter pivots back and forth along the double-headed arrow P through about 180°. Instead, it is also possible for the filter to pivot through a greater angle and, in certain cases, rotate through more than 360°. In all these cases, an even build-up of filter cake on the filter element 24 will occur. As the flexible membrane can be twisted only to a limited extent, it is best for pivoting movement to extend only through 180°, as shown by double-headed arrow R (FIG. 4), when the filter is open.

The entire filter as illustrated in FIGS. 1 and 2 can, in practice, be completely and hermetically enclosed by a housing since it is not necessary to have access to the parts of the filter either in the position of FIG. 1 or in the position of FIG. 2 and all the processes are carried out automatically.

The bayonet catch described, which is provided by the tube 21, the arm 26 and the toothed rings 27 to 31, is particularly advantageous because the actual point of closure is completely covered by the tube 21 and the membrane 25 and cannot be soiled by the components of the suspension. The tube 21 therefore acts at the same time as a protective or cover tube for the bayonet closure between outer casing 1 and cover 17.

Once the actual filtering process, which is carried out in the closed position shown in FIG. 1, has ended, an overpressure may be introduced via the short suction and pressure connection pipe 4 on the outer casing 1. This causes the flexible membrane 25 to be pressed onto the filter cake deposited on the filter element 24 all the way round in order to largely squeeze out any residual fluid.

I claim:

1. A filter for squeezing out suspensions comprising a boiler-shaped outer casing, a cover releasably closing said outer casing at its open end face, a tubular filter element projecting from said cover coaxially to the axis of the outer casing, a flexible, hose-like membrane arranged coaxially between the outer casing and the filter element, said membrane being connected at one edge to the open end face of the outer casing and at the other edge to the free end face of the filter element remote from the cover such that the membrane is inverted when the cover is removed coaxially from the outer casing, also comprising a short suction and pressure connection pipe on the outer casing, a feed connection pipe for the suspension and a discharge connection pipe for the filtrate, these pipes being provided on the cover, and means operable in the closed state of the filter for rotating the outer casing and the membrane and the filter element as a unit about their common axis and operable in the opened state of the filter for rotating the filter element relative to the stationary outer casing while twisting the membrane.

2. A filter as in claim 1, further comprising a sliding guide means on which the outer casing and cover are slidingly displaceable relative to one another in a direction parallel to their common axis and a releasable connection between the outer casing and the sliding guide means.

3. A filter as in claim 1, further comprising a machine frame in which the cover is pivotally mounted and the outer casing is connectable to said cover.

4. A filter as in claim 1, wherein the common axis of the outer casing and the membrane and the filter element is inclined downwardly toward the cover.

5. A filter for squeezing out suspensions comprising a boiler-shaped outer casing, a cover releasably closing said outer casing at its open end face, a tubular filter element projecting from said cover coaxially to the axis of the outer casing, a flexible, hose-like membrane arranged coaxially between the outer casing and the filter element, said membrane being connected at one edge to the open end face of the outer casing and at the other edge to the free end face of the filter element remote from the cover such that the membrane is inverted when the cover is removed coaxially from the outer casing, also comprising a short suction and pressure connection pipe on the outer casing, a feed connection pipe for the suspension and a discharge connection pipe for the filtrate, these pipes being provided on the cover, and means operable in the closed state of the filter for rotating the outer casing and the membrane and the filter element as a unit about their common axis, bayonet catch means for connecting the outer casing to the cover, said bayonet catch means being covered by the membrane, a protective tube projecting from the inner side of the cover, an arm, means on the free end of said tube remote from said cover for supporting said arm, said arm projecting into the interior of the outer casing and bayonet catch elements on said arm.

* * * * *